United States Patent
Gottlieb et al.

(10) Patent No.: US 10,086,807 B2
(45) Date of Patent: *Oct. 2, 2018

(54) METHOD AND CONTROL DEVICE FOR OPERATING A BRAKING DEVICE OF A DRIVE TRAIN WITH AN AUTOMATIC GEARBOX OF A VEHICLE

(71) Applicant: AUDI AG, Ingolstadt (DE)

(72) Inventors: Dominik Gottlieb, Ingolstadt (DE); Daniel Geltl, Abensberg (DE)

(73) Assignee: AUDI AG, Ingolstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/121,477

(22) PCT Filed: Feb. 25, 2015

(86) PCT No.: PCT/EP2015/000427
§ 371 (c)(1),
(2) Date: Aug. 25, 2016

(87) PCT Pub. No.: WO2015/128083
PCT Pub. Date: Sep. 3, 2015

(65) Prior Publication Data
US 2016/0355164 A1    Dec. 8, 2016

(30) Foreign Application Priority Data
Feb. 26, 2014    (DE) .................. 10 2014 002 817

(51) Int. Cl.
*B60T 8/32*    (2006.01)
*B60T 7/12*    (2006.01)
(Continued)

(52) U.S. Cl.
CPC .............. *B60T 7/122* (2013.01); *B60T 1/005* (2013.01); *B60T 2201/06* (2013.01); *F16H 63/486* (2013.01)

(58) Field of Classification Search
CPC ...... B60T 7/122; B60T 1/005; B60T 2201/06; F16H 63/486
(Continued)

(56) References Cited

U.S. PATENT DOCUMENTS 6,679,810 B1    1/2004    Boll et al.
8,909,449 B2 *  12/2014   Eberling ............... B60T 8/1708
                                                    303/121

(Continued)

FOREIGN PATENT DOCUMENTS

CN    101568454 A    10/2009
DE    197 11 851 A1    9/1998
(Continued)

OTHER PUBLICATIONS

International Search Report dated May 12, 2015 in corresponding Application No. PCT/EP2015/000427; 14 pgs.
(Continued)

Primary Examiner — Pamela Rodriguez
(74) Attorney, Agent, or Firm — Maier & Maier, PLLC (57) ABSTRACT

A method for operating a braking device of a drive train of a vehicle, the drive train including an automatic gearbox of a vehicle, and the vehicle further having a gear-side parking lock, a service brake, and a parking brake that can be operated independently from the service brake. When a parking condition occurs, the parking lock may be engaged by a control device if the vehicle is protected from rolling away by a service brake that can be operated independently from the parking brake. The parking lock may then be configured to remain engaged until a driving condition occurs for the vehicle. This may optimize the parking lock operation in such a way that reliably prevents a disengage-
(Continued)

ment impulse when the parking lock is disengaged, preventing the vehicle from rolling when entering or leaving a parked state.

23 Claims, 6 Drawing Sheets

(51) Int. Cl.
*B60T 1/00* (2006.01)
*F16H 63/48* (2006.01)

(58) Field of Classification Search
USPC .......... 303/191, 192, 127, 121, 198; 701/70; 477/194, 195, 196–199
See application file for complete search history.

(56) References Cited

U.S. PATENT DOCUMENTS

| | | | | |
|---|---|---|---|---|
| 9,233,675 | B2 * | 1/2016 | Grell | B60T 7/122 |
| 9,809,205 | B2 * | 11/2017 | Forster | B60T 7/122 |
| 9,821,775 | B2 * | 11/2017 | Clarke | B60T 1/005 |
| 9,821,778 | B2 * | 11/2017 | Frijas | B60T 7/122 |
| 2008/0051252 | A1 * | 2/2008 | Nishimura | B60T 1/005 477/92 |
| 2008/0086252 | A1 * | 4/2008 | Nakayama | B60T 7/122 701/80 |
| 2010/0048352 | A1 * | 2/2010 | Yamamoto | B60T 7/085 477/92 |
| 2012/0191311 | A1 | 7/2012 | Mohile et al. | |

FOREIGN PATENT DOCUMENTS

| | | |
|---|---|---|
| DE | 198 38 886 A1 | 10/1999 |
| DE | 103 40 250 A1 | 3/2005 |
| DE | 10 2004 015 710 A1 | 7/2005 |
| DE | 60206233 T2 | 6/2006 |
| DE | 10 2007 047 234 A1 | 4/2008 |
| DE | 102007029910 A1 | 9/2008 |
| DE | 20 2008 013 392 U1 | 1/2009 |
| DE | 10 2009 038 138 A1 | 12/2010 |
| DE | 10 2011 018 875 A1 | 10/2012 |
| DE | 10 2011 110 913 A1 | 2/2013 |
| DE | 10 2011 088 669 A1 | 6/2013 |
| DE | 10 2013 102 606 A1 | 9/2013 |
| DE | 102012223113 A1 | 6/2014 |
| DE | 10 2013 217 986 A1 | 8/2014 |
| DE | 10 2013 212 829 A1 | 1/2015 |
| EP | 0 976 634 A2 | 2/2000 |
| EP | 1 327 566 B1 | 7/2003 |
| EP | 2 559 600 A1 | 2/2013 |
| JP | 8-198080 A | 8/1996 |
| WO | 02/046007 A1 | 6/2002 |
| WO | 2013104641 A1 | 7/2013 |

OTHER PUBLICATIONS

German Examination Report dated Feb. 20, 2015 in corresponding Application No. 10 2014 002 817.8; 8 pgs.
Winner, Hermann; Wolf, Gabriele: Handbuch Fahrerassistenzsysteme: Grundlagen, Komponenten und Systeme für aktive Sicherheit und Komfort. Wiesbaden: Vieweg+Teubner, 2009. S. 271-286.—ISBN: 9783834802873, 18 pgs.
International Preliminary Report on Patentability dated Jun. 9, 2016 in corresponding Application No. PCT/EP2015/000427; 15 pgs.
Notification of Transmittal of Translation of the International Preliminary Report on Patentability dated Sep. 1, 2016, in connection with corresponding International Application No. PCT/EP2015/000427 (7 pgs.).
Chinese Office Action dated Apr. 10, 2017, in connection with corresponding Chinese Application No. 201580010363.6 (8 pgs.).
Chinese Office Action dated Dec. 19, 2017, in connection with corresponding Chinese Application No. 201580010363.6 (11 pgs.).
European Office Action dated Jun. 5, 2018, in connection with corresponding European Application No. 15711044.6 (4 pgs.).

* cited by examiner

METHOD AND CONTROL DEVICE FOR OPERATING A BRAKING DEVICE OF A DRIVE TRAIN WITH AN AUTOMATIC GEARBOX OF A VEHICLE

BACKGROUND

The invention concerns a method for operating a braking device of a drive train with an automatic gearbox of a vehicle, specifically a motor vehicle. Furthermore, the invention concerns a control device for operating a braking device of a drive train with an automatic gearbox of a vehicle, specifically a motor vehicle, as well as a vehicle.

In modern motor vehicles with an automatic gearbox, there are various safety mechanisms to ensure that the vehicle is parked securely. These safety mechanisms forming components of a braking device are primarily the parking brake and the service brake, and also the parking lock of the automatic gearbox itself. The service brake mainly makes it possible to reduce the vehicle speed to make it stop; it is normally operated with a foot via a brake pedal; however, there can also be a brake booster device (active brake booster), or a slip control system—for example, highly-automated and piloted driving. The service brake preferably affects all the wheels of the vehicle. The service brake is often designed as a hydraulic brake, in which the brake power is transferred via liquid pressure in brake lines; however, there can alternatively be a pneumatic service brake, in which the brake power is transferred via compressed air in the brake lines.

Conventionally, the parking brake (often also called emergency brake) is conventionally a mechanical brake that is actuated by the driver's hand or foot, and which creates a locking force in the wheel connected to it via cables. Specifically, when the brake is actuated by the operator, a mechanical force is produced and transferred via mechanical cables to the braking device, in which this force is then exerted onto a brake disk or a brake drum. Modern parking brakes are designed as electric or electronic brakes, in which the actuators that transfer the braking power are controlled by an electric control device. The parking brake is designed to prevent a stopped or parked vehicle from rolling away—even when the vehicle is on a sloped surface. In other words, the parking brake as well as the parking lock, which is described below in more detail, are primarily designed and used for parking a vehicle for an unlimited period of time, whereas the service brake is mainly used to stop the vehicle for a short period of time.

The parking lock in the automatic gearbox works in a way that when the driver switches to the parking gear P, e.g. using a gear lever, a parking catch is engaged in the gearbox, preferably controlled electrically or electromechanically. This parking catch locks the parking interlock gear, which is preferably installed torque-proof on an output drive shaft of the gearbox or the drivetrain. The parking catch can be attached, for example, to the casing of the gearbox. When the parking catch locks the parking interlock gear, the parking interlock gear is blocked in a way that it can no longer turn, which results in the output drive shaft or the drive train of the vehicle being blocked, with the corresponding wheels of the vehicle being locked as well. If a vehicle is parked on a sloping surface, the parking lock is normally subjected to load, as the vehicle (after the parking gear P is engaged) rolls back a little, until the parking lock engages. Specifically, in this case, the parking interlock gear is subjected to torque created by the slope resistance that affects the vehicle. This torque is exerted on the parking lock on the gearbox casing, which leads to the catch gearing to interlock with the gearing of the parking interlock gear, during which (depending on the direction of the torque) a right-side or a left-side parking lock interlock occurs. This interlocked state in the drive train or in the gearbox creates the situation in which, if the parking lock is disengaged or deactivated (i.e. the gearing of the parking catch is moved out of contact with the gearing of the parking interlock gear), the drivetrain is released immediately, which can be felt in the vehicle with a noticeable jerk, being often accompanied by a loud noise (the disengagement impulse), which can be unpleasant or disruptive to the user.

An additional disadvantage is that the force necessary to disengage the parking lock increases with the amount of force exerted to create the interlock. Sometimes this can even create a situation that the parking lock can be disengaged only with a lot of force. The strength of the interlock itself depends on the brake torque of the wheels, which is, in turn, dependent on the slope resistance. The slope resistance depends on the slope of the road surface and the weight of the vehicle.

According to DE 10 2013 212 829 A1, there is already a system and a method acknowledged for combined control of an electronically controlled parking brake and an electronically controlled parking lock, which is designed as a mechanical interlock, of a motor vehicle, which should prevent a disengagement impulse created when disengaging a parking lock of a motor vehicle designed as a mechanical interlock. Specifically, this system comprises an electronic parking device that controls the parking brake electronically, an electronic locking device that controls the parking lock, an electronic hill-start assistant device that controls the parking brake electronically, an electronic device that detects the occurrence of at least one parking condition, and an automatic sequence control device that controls the parking device, the locking device and the hill-start assistant device in a way that, when a parking condition is detected, the parking lock is activated via the locking device, then the parking device begins to increase the braking pressure necessary to lock the parking brake, with the parking brake remaining locked via the hill-start assistant device, until the parking device produces enough braking pressure to lock the parking brake. As a result of the parking brake being locked via the hill-start assistant device until the parking device produces enough braking pressure to lock the parking brake, it should be prevented that a vehicle, after the parking lock is activated, can move from a standing position, when the braking pressure created by the parking device to lock the parking brake is not enough to lock the parking brake. Thus it should be prevented that the parking lock designed as a mechanical interlock comes under stress. Furthermore, this should prevent the unwanted disengagement impulse created when the parking lock is disengaged. This means, specifically, that the vehicle is protected against rolling away only via the parking brake.

Despite this measure, situations can occur when the driver feels an unreduced disengagement impulse. For example, this can happen when the driver (the vehicle being stopped, and the parking lock being engaged) releases the parking brake before disengaging the parking gear: the vehicle can roll away, and thus the parking lock can interlock as described above.

SUMMARY OF THE DISCLOSURE

In contrast, the task of this invention is to create a method and a control device for operating a braking device of a vehicle (particularly, a motor vehicle) with an automatic gearbox that optimizes the parking lock operation in such a way that reliably prevents a disengagement impulse when the parking lock is disengaged.

This task is completed with the features specified in the independent patent claims. The beneficial features of the invention are subject to the corresponding sub-claims.

According to an exemplary embodiment, the method for operating a braking device of a drive train with an automatic gearbox of a vehicle (particularly a motor vehicle), with a gearside parking lock, with a service brake (e.g. a pneumatic or a hydraulic one), and with a parking brake (e.g. an electric parking brake) that can be operated independently from the service brake. In accordance with the invention, the parking lock, when at least one parking condition occurs, is, controlled only via at least one control device, engaged, if the vehicle is protected from rolling away by a service brake that can be operated independently from the parking brake.

Thus, with the method of the invention, the driver is supported when parking the vehicle, whereby the solution of the invention makes possible a comfortable, non-loaded and non-interlocked engaging of the parking lock, as well as normally a non-loaded and non-interlocked disengaging of the parking lock, with only slight disengagement impulse or without any disengagement impulse at all. That means that, ultimately, less force is applied to the parking lock when it is disengaged. At the same time, the solution of the invention leads to less stress on the components of the gearbox, even when the vehicle is parked.

The concepts of non-loaded and non-interlocked in relation to the parking lock mean that a parking catch of the parking lock engages with the parking interlock gear of the parking lock in a way that, when the parking lock is disengaged, the disengagement impulse is negligible or non-existent, i.e. that there is no interlock between the parking catch and the parking interlock gear, specifically between the gearing of the parking catch and the gearing of the parking interlock gear, or, at most, there is such a pre-defined small interlock between the parking catch and the parking interlock gear, specifically between the gearing of the parking catch and the gearing of the parking interlock gear, that a disengagement impulse can still be avoided, or at least reduced or avoided to a great extent.

According to the solution of the invention, the engaging of the parking lock is delayed for long enough to make sure via the service brake (preferably operated by the driver) that the vehicle cannot move anymore. For this purpose, according to the specific execution variant, it can be determined if the service brake-side brake pressure, specifically that independent from any further operation of the service brake by the driver, is adjusted in a way that prevents the vehicle from rolling away when the parking condition occurs. It can immediately be true that, when the parking condition takes place, the service brake-side brake pressure available is already sufficient to hold the vehicle still and to prevent it from rolling away, which should normally be the case when the driver brings the vehicle to a halt by braking. In other words, if the brake pressure of service brake is sufficient to hold the vehicle still, the parking lock can be immediately be engaged, and there is no need to wait until the slower parking brake is engaged instead of the service brake.

This means, however, that if the control device, when the parking condition occurs, is activated essentially simultaneously with the parking brake, the parking lock can be engaged by the control device before a parking brake force preventing vehicle movement is created, so it can be engaged before the parking brake is engaged, because the vehicle is prevented from rolling away via the service brake. The service brake-side brake pressure that prevents vehicle movement, thus, can be made available faster than a parking brake force that prevents vehicle movement.

However, should the brake pressure of the service brake not be sufficient to prevent the vehicle from rolling away when the parking condition occurs (i.e. the brake pressure falls short of a pre-defined brake pressure level that prevents the vehicle from rolling away via the service brake), the brake pressure can be increased in a way (preferably automatically or via the control device) that prevents the vehicle from rolling away, and only then the parking lock is allowed to be engaged. This increase in the brake pressure can, for example, be created by a feeding device or a pump (e.g. a pump of the brake circuit). Such a pump of the brake circuit can, for example, be a hydraulic pump and/or a pump of the ESP and/or ESC system.

Maintaining the service brake-side brake pressure when the parking condition occur takes place mostly independently for any further actuation of the service brake—e.g. a brake pedal of the service brake by the driver. Maintaining the service brake-side brake pressure can, for example, take place in a way that the currently available service brake-side brake pressure is locked, which can be done via corresponding valve control.

For the case, when the parking condition occurs, the control device is activated essentially simultaneously with the parking brake, it is preferably to be provided that the service brake-side pressure that prevents the vehicle from rolling away (or moving) is maintained (and controlled by the control device) so long as for the parking brake to achieve the locking power that would prevent the vehicle from moving. In other words, this means that when the parking brake is engaged and the vehicle is prevented from rolling away, the service brake-side brake pressure does not have to be maintained anymore, and, therefore, can be reduced. This can, for example, be controlled using a reduction curve.

According to another independently claimed embodiment of the invention, a method is proposed for operating a braking device of a drive train with an automatic gearbox of a vehicle (specifically a motor vehicle), with a gear-side parking lock, with a service brake, and with a parking brake that can be operated independently from the service brake. According to the invention, at least one control device, if the service brake-side brake pressure (when the parking condition occurs) is not sufficient to prevent the vehicle from rolling away, determines if the locking force of the parking brake engaged when the parking condition occurs is sufficient to prevent the vehicle from rolling away. If this should be the case, i.e. that the parking brake force is sufficient, the parking lock can be allowed to be engaged. Otherwise, the parking lock is prevented from being engaged until the service brake-side brake pressure and/or the force of the parking brake is enough to prevent the vehicle from rolling away. Should the protection of the vehicle from rolling away be provided by the parking brake, the (if any) available or eventually created service brake-side brake pressure would be reduced in the way described above. This method can, for example, be beneficial as a redundancy or in situations when no sufficient service brake-side brake pressure can be provided, or it cannot be provided fast enough, for example, due to system features or defects.

In relation to the specified solution of the invention, the occurrence of a parking condition should be understood in general terms, and can, for example, be determined by specialized sensors detecting a decreasing load on a brake pedal of the service brake. That is, the occurrence of a parking condition can only take place when specific actions, operating circumstances imply that the vehicle is to be parked, e.g. when the driver leaves the vehicle. Nevertheless, the engaging of a parking gear of the automatic gearbox is deemed a preferable parking condition, whereby the gearbox-side parking lock should be engaged via the control device.

The previously created executions concern primarily the parking procedure, whereby it must be made sure that the parking lock is engaged without load, in order to avoid a disengagement impulse as much as possible when the parking lock is disengaged again.

In order to prevent functionally and reliably the disengagement impulse during the start-up procedure and/or to maintain the functionally reliable absence of load on the parking lock when the parking condition is lifted, a procedure is proposed, whereby the vehicle, i.e. a parked vehicle with an engaged parking lock (particularly, a parking lock engaged without load) when a driving condition occurs, is protected against rolling away via at least one brake device (preferably independently from the driver's intention and/or preferably controlled with at least one control device), until the parking lock is disengaged.

With this procedure, it is ensured that the absence of load on the parking lock is maintain even after the parked state ends. This can be generally achieved via a engaged parking brake and/or a corresponding service brake-side brake pressure. In other words, the disengagement impulse can be reduced or prevented when the driving condition occurs (i.e. the parked state ends) by making sure that the engaged parking lock is always disengaged before the parking brake is disengaged and/or the service brake-side brake pressure that prevents rolling away is reduced.

Thus, with this method, regardless of the driver's intention (i.e. expressly against the driver's intention, which can be, for example, releasing the parking brake when the parking lock is still engaged), the brake power that prevents rolling away can be maintained until the parking lock is securely disengaged.

In other words, it is made sure that the parking lock can be disengaged without load, as the vehicle does not move during the disengagement procedure. The occurrence of a driving condition (or the end of the parking state) can be any appropriate operating situation and operation of any operating devices that are implied in the actions immediately preceding the driving procedure or occurring during this procedure, for example, the switching of a parking gear to a gear that is not the parking gear of the automatic gearbox, e.g. a driving gear, and/or the release of the parking brake and/or the engaging of the service brake.

This procedure is also particularly preferred in relation to a vehicle that is equipped with a service brake (preferably, a hydraulic or a pneumatic service brake), and a parking brake that is operated independently from the service brake (preferably, an electrical parking brake), which can be used to prevent the vehicle from rolling away.

A specific procedure is particularly preferable, in which disengaging the parking lock (on a parked vehicle with the engaged parking lock and activated parking brake) when releasing the parking brake is only completed by the control device if the service brake prevents the vehicle from rolling away (which is determined, for example, by the control device). In other words, this means that a driver, regardless of whether the driver has or has not engaged the service brake, releases the parking brake, whereby there is a danger that the parking lock of the vehicle is engaged and is subjected to load and interlock, which can lead to a disengagement impulse when the parking lock is disengaged. As a result, in this case, the control device first checks if the vehicle is protected against rolling away via the service brake; only when this is the case, the control device allows the disengagement of the parking lock.

According to a specific procedure, a provision is made that it is determined by the control device, if the service brake-side brake pressure (particularly independent from any further operation of the service brake by the driver) at the moment of disengaging the service brake operated by the parking brake is set in a way that protects the vehicle against rolling away. For this purpose, the current service brake-side brake pressure (at the engaged service brake when the parking brake is released), particularly independent from any further operation of the service brake by the driver, can be maintained by the control device. If, for example, the available service brake-side brake pressure is sufficient to prevent the vehicle from rolling away by this point in time already, then the disengagement of the parking lock can be allowed by the control device, and be executed as necessary. This specific procedure takes into account the fact that the service brake-side brake pressure, in case of the engaged service brake, is usually sufficient to prevent the vehicle from rolling away, and that the driver intending to drive away normally must engaged the service brake to begin the driving procedure. Maintaining the service brake-side brake pressure can, for example, take place in a way that the currently available service brake-side brake pressure is locked, which can be done via corresponding valve control.

Should it, however, occur that at the time of disengaging the parking brake, the current service brake-side brake pressure (with or without the service brake being engaged) is not sufficient to prevent the vehicle from rolling away: for example, if the brake pressure does not reach a pre-defined brake pressure level, or if there is not brake pressure at all, then the brake pressure (preferably independently and/or controlled by the control device) is raised to the level that prevents the vehicle from rolling away—for example, by raising the brake pressure to the brake pressure level that is pre-defined as sufficient to prevent the vehicle from rolling away. In this case, the disengagement of the parking brake and the parking lock can only then be allowed, and then executed as necessary, when enough brake pressure is created to prevent the vehicle from rolling away and when the control device determines that the pre-defined brake pressure level has been reached, and the vehicle is thus protected against rolling away. This can, for example, be done by a feeding device or a pump (e.g. a pump of the brake circuit). Such a pump of the brake circuit can, for example, be a hydraulic pump and/or a pump of the ESP and/or ESC system. The case described above should also expressly include operation situations, in which the brake pressure of the service brake must be raised from zero—for example, when the driver cannot actuate the service brake (such as when driving in a highly-automated or piloted mode, when the driver is not in the vehicle). Here, the brake pressure must be actively raised from zero by an active brake booster and/or a slip control system (ESC).

According to another particularly preferred procedure, the service brake-side brake pressure that prevents the vehicle from rolling away is reduced after switching to a gear that is not the parking gear (e.g. a driving gear), reduced in particular with the control device, so that driving is allowed, only when the driving force of the vehicle is greater than the slope resistance. The latter in particular takes into account the preferred case of using the invention in relation to a vehicle parked on a slope and the intention to start driving from this sloped position.

In the event of the driver, after releasing the parking brake, not switching from the parking gear to a gear that is not the parking gear within the pre-defined period (e.g. 10 minutes—although other periods can be pre-defined), it is to be assumed that the driver would not like to drive within the foreseeable future, and the task of securing the vehicle is transferred to the parking brake. In this case, the parking lock likewise remains without load. This procedure takes into account that current brake circuits do not maintain brake pressure with a working medium (e.g. hydraulic) for a long time, and a system-caused reduction in pressure takes place, which would require a boosting process (which would also, obviously, be possible in principle) that would be prevented from occurring when the braking is transferred to the parking brake.

According to an alternative procedure, it can be provided that the control device only releases the parking brake (on a parked vehicle, with the parking gear switched on and the parking brake activated, when the driver initiates the release of the parking brake and does not engage the service brake) when the parking gear is switched off. In other words, this means that the driver does not actuate the service brake, simply releasing the parking brake instead. This immediate release of the parking brake will, however be prevented by the control device, regardless of how often the driver would initiate this release, because otherwise, the vehicle would be held by the parking lock, with undesirable tension created there. The control device, thus, only releases the parking brake when the parking lock is disengaged.

According to another optional beneficial design, it can be provided that at least one control device completes the method only if at least one control device determines that the vehicle is parked with the parking lock engaged without any load. This can, for example, take place by determining the load on the parking lock, for example, by determining the torque exerted on the parking interlock gear and created by the slope resistance affecting the vehicle, and the torque that is transferred via the parking catch onto the gearbox casing. With such a procedure, it is, thus, made sure that the actions that are part of the method of the invention are only executed when a disengagement impulse can be reliably prevented or at least reduced.

Even though previously, for the sake of clarity, the explanations included one control device, it is understood that the implementation of the solution of the invention can obviously include several control devices. Thus, it is provided according to a particularly preferred specific design that at least one control device (comprising, specifically, at least a control and/or an analysis device) is available, making sure that the activation or deactivation of the parking lock, and specifically a catch of the parking lock, can be controlled electronically. Alternatively or additionally, at least one control device (comprising, specifically, at least a control and/or an analysis device) can be provided, used to control electronically the service brake, specifically at least one brake cylinder of at least one wheel of a vehicle, and/or to maintain or create or reduce brake pressure. As a further alternative or addition, at least one control device (comprising, specifically, at least a control and/or an analysis device) can be provided, used to activate or deactivate electronically the parking brake, specifically an electric parking brake. At this point, it should be further mentioned that the concept of an electric parking brake is understood here in a broad sense, encompassing all types of electric parking brakes, including, for example, electromechanical or electromotive parking brakes.

With one or several such control devices, it is made possible (subject to the actuators and/or sensors, if any, already available on the vehicle) to complete the procedure of the invention in a simple way with high function reliability.

Specifically, the procedure of the invention is executed in an advantageous way when the vehicle is parked on a slope, that is, the execution of the solution of the invention can, for example, be made dependent on whether the vehicle is located on a slope, or not. A vehicle located on a slope, or, in general, any non-horizontal surface can be mainly defined in different ways. For example it can be defined that a vehicle is considered located on a slope, only when at least one control device determines that the sloped surface has a specific increase or decrease, preferably defined as a corresponding slope angle, if it is reached or exceeded. Alternatively, or additionally, it can be defined that a vehicle is considered located on a slope also only in those cases, when at least one control device determines that the slope resistance has reached or exceeded a certain pre-defined threshold value. With such slope-dependent criteria, it is made sure that the method of the invention is executed (instead of or in addition to the desired parking lock function) in the way described by the invention, only when a certain height or an interlock of the drive train that exceeds a defined threshold is expected. That is, if, for example, no such parking-on-a-slope situation occurs, then the parking lock is simply activated/deactivated as normal, without the need to use the procedure of the invention.

Determining if the vehicle is located on a slope can, for example, take place via an onboard sensor device, or alternatively, or additionally, via at least one onboard navigation device. The sensor device can, for example, comprise an onboard slope sensor and/or an onboard acceleration sensor that send the data to the control device, which then can use them to determine the incline of the sloped surface or, alternatively or additionally, determine the slope resistance. The acceleration sensor can make it possible to measure the initial acceleration. If the sensor is tilted, then the earth acceleration does not affect its vertical sensor axis in full, so such tilting can be determined. With a navigation device, positioning data and coordinates can be determined and compared with the terrain and topography data loaded onto the device, in order to determine, if the vehicle is located on a slope.

A selection device of the automatic drive preferably has an onboard switching device that can be controlled by the driver (e.g. a hand-operated gear lever), and which can be used to engage or disengage the parking gear. If the external switching device is located in this parking gear position, then the control device transmits the intention to activate the parking lock, preferably via a signal line and/or electrically. The transmission specifically takes place via the SHIFT-BY-WIRE equipment and a specialized interface, or, for example, via the vehicle bus, e.g. a CAN bus. The same is also true for switching off the parking gear.

The advantages of the control device assumed by the invention have already been extensively reviewed above. In this regard, the previously made executions should be referred to. As a simple addition to this, it should be noted that such a control device can also be designed as a control unit mounted on the vehicle, for example, via a gearbox control unit and/or a brake control unit.

The previously proposed (and/or provided again in the dependent claims) advantageous executions and/or improvements of the invention can—except for situations of unambiguous dependencies or incompatible alternatives—be implemented alone or in any combination among one another.

BRIEF DESCRIPTION OF THE DRAWINGS

The invention is explained below using a drawing as an example only.

The figures depict.

DETAILED DESCRIPTION OF THE DRAWINGS

Figure 1:
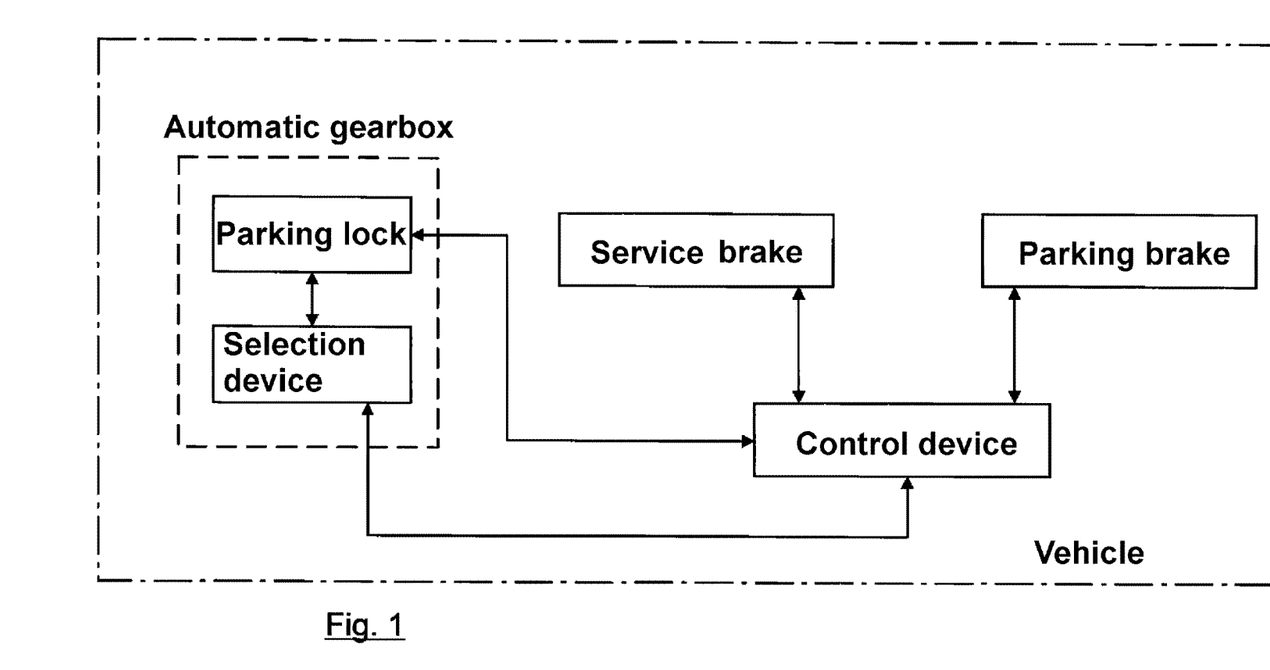
FIG. 1 a schematic and general structure of a vehicle-side device for completing the invention method, FIG. 2 a schematic example of a flowchart for engaging a parking lock, FIG. 3 a method for engaging a parking lock that is alternative to that of FIG. 2, FIGS. 4 to 6 schematically different examples of flowcharts for disengaging a parking lock.

FIG. 1 shows an example of a structure of a device for completing the invention method, which involves a control device, a parking brake, a service brake as well as an automatic gearbox (shown as a dashed line). The automatic gearbox comprises, among other things, an initially described parking lock, as well as a selection device, with which a parking gear as well as at least one driving gear can be selected. Specifically, the selection device can be designed as a switching device inside the vehicle that can be controlled by the driver (e.g. a hand-operated gear lever), which can be used to engage the parking gear and at least one driving gear.

The selection device is connected to the parking lock via a signal line, and in a way that, according to a basic setup, when the parking gear is selected, the parking lock is engaged, specifically an electrically controlled and electro-mechanically operated parking catch locks onto the corresponding parking interlock gear. This basic setup has been appropriately modified via the invention-related solution (which is further explained with select examples below) in order for the parking lock to engage or disengage, only when it is made sure that the parking lock can be disengaged with reduced load, and with a reduced or eliminated disengagement impulse.

As it can be further seen in FIG. 1, such a vehicle (specifically, a motor vehicle) with an automatic gearbox comprises also a service brake and a parking brake that can be activated and deactivated independently from the service brake. The service brake can be designed as a hydraulic service brake, but it can be designed as a pneumatic service brake. The parking brake can generally be a mechanical parking brake, although an electric parking brake is preferred.

Furthermore, as shown in FIG. 1, the vehicle comprises at least one control device, which is connected via signal lines with the service brake, the parking brake, the parking lock and the selection device. Thus the activation or deactivation of the parking lock, and specifically a catch of the parking lock, can be controlled via the control device. The control device can be, furthermore, used to control electronically the service brake, specifically at least one brake cylinder of at least one wheel of a vehicle, and/or to maintain or create or reduce brake pressure. The control device can also be used to control the activation or deactivation of the parking brake.

The signal connection between the selection device and the control device, for example, makes it possible to receive feedback on the selection device being switched to a parking gear or switched off a parking gear.

Figure 2:
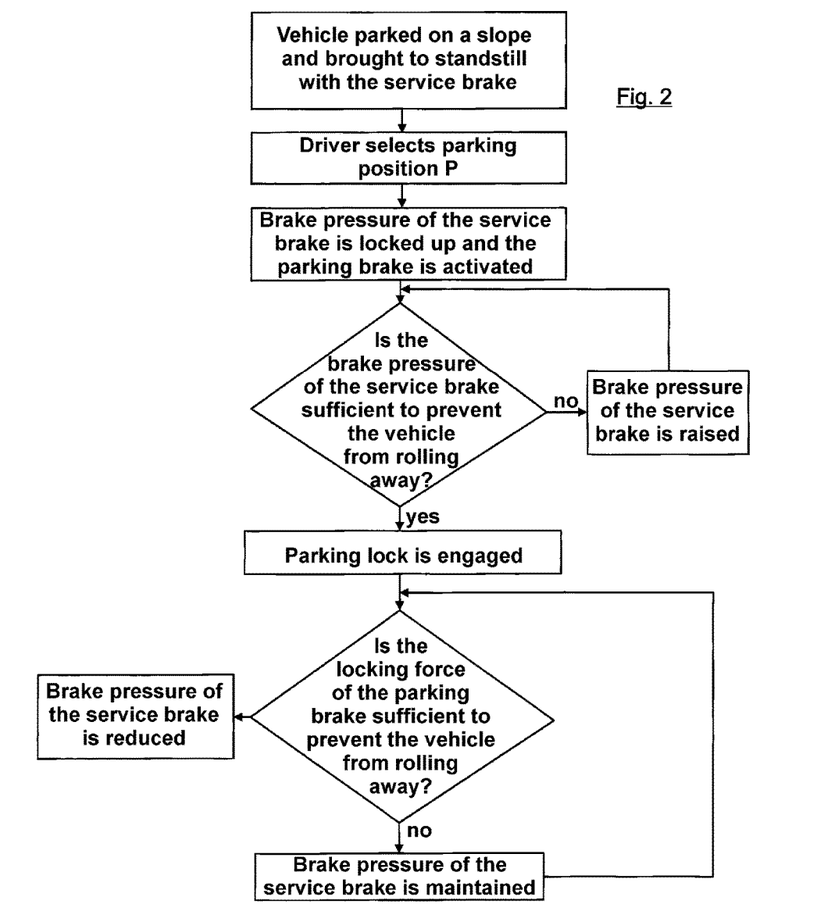

With such a device in a vehicle (which can obviously comprise other components), the parking lock can be engaged in a preferable way as described in a flow chart in FIG. 2: this method makes sure that the parking lock is engaged without interlocking and without load, so that a disengagement impulse is avoided or at least significantly reduced when the parking lock is disengaged.

As shown in FIG. 2, it can be, for example, assumed that the vehicle is parked on a slope, and is brought to a stop with a service brake. Then, if the driver selects the parking gear P, it this is interpreted as a parking condition, and an increasing service brake-side pressure is locked by the control device (specifically independently from further triggering of the service brake by the driver), for example, by adjusting the valves of the brake circuit. The term "locked" should expressly be used here in a broad sense, and it should expressly comprise all the measures that are suitable for setting a specific operating pressure.

It is preferred, as shown in FIG. 2, that the parking brake is activated virtually simultaneously by the control device.

In the next step, it is checked, if the brake pressure of the service brake is sufficient to prevent the vehicle from rolling away or to prevent securely any movement of the vehicle.

If this is not the case (because the current locked service brake-side brake pressure is not sufficient to prevent the vehicle from rolling away), the control device engages a feeding device, e.g. a pump of the brake circuit, in order to increase the brake pressure by and large automatically to the desired or pre-defined brake pressure level. The brake pressure of the service brake is thus sufficient to prevent the vehicle from rolling away, then the parking lock is allowed to be engaged, and the parking lock can be engaged.

However, if the locked service brake-side brake pressure of the service brake is already sufficient to prevent the vehicle from rolling away, then the parking lock is allowed to be engaged, and the parking lock can be engaged immediately.

Then, with the parking brake activated, it can be determined if the force of the parking brake is sufficient to prevent the vehicle from rolling away. If this is the case, the brake pressure of the service brake can be reduced. Otherwise, the brake pressure of the service brake will be maintained until this condition is fulfilled.

As soon as the force of the parking brake is sufficient to prevent the vehicle from rolling away, it is made sure that, despite the engaged parking lock, no interlock of the parking lock can occur, and thus, when the vehicle is started-up, the parking lock can be disengaged without a disengagement impulse.

Figure 3:
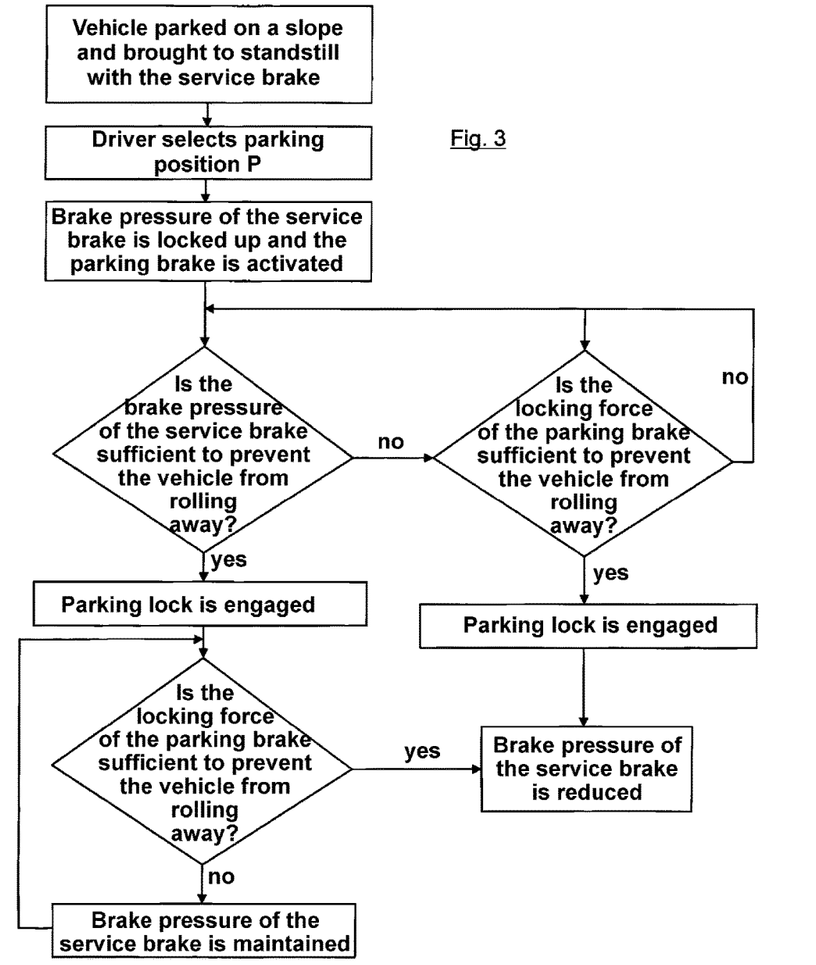

In FIG. 3, however, an alternative to the method described in FIG. 2 is presented. It differs from the previous method in that, in the event of a parking condition occurring and the current service brake-side brake pressure falling short of the pre-defined brake pressure necessary to protect the vehicle from rolling away, the control device checks if the parking brake force of the activated parking brake is already present to prevent the vehicle from rolling away. If this is the case, then the parking lock can be engaged. Then, the available or locked service brake-side brake pressure can be reduced in a defined way. Otherwise, the parking lock is prevented from being engaged until the service brake-side brake pressure and/or the force of the parking brake is enough to prevent the vehicle from rolling away.

Figure 4:
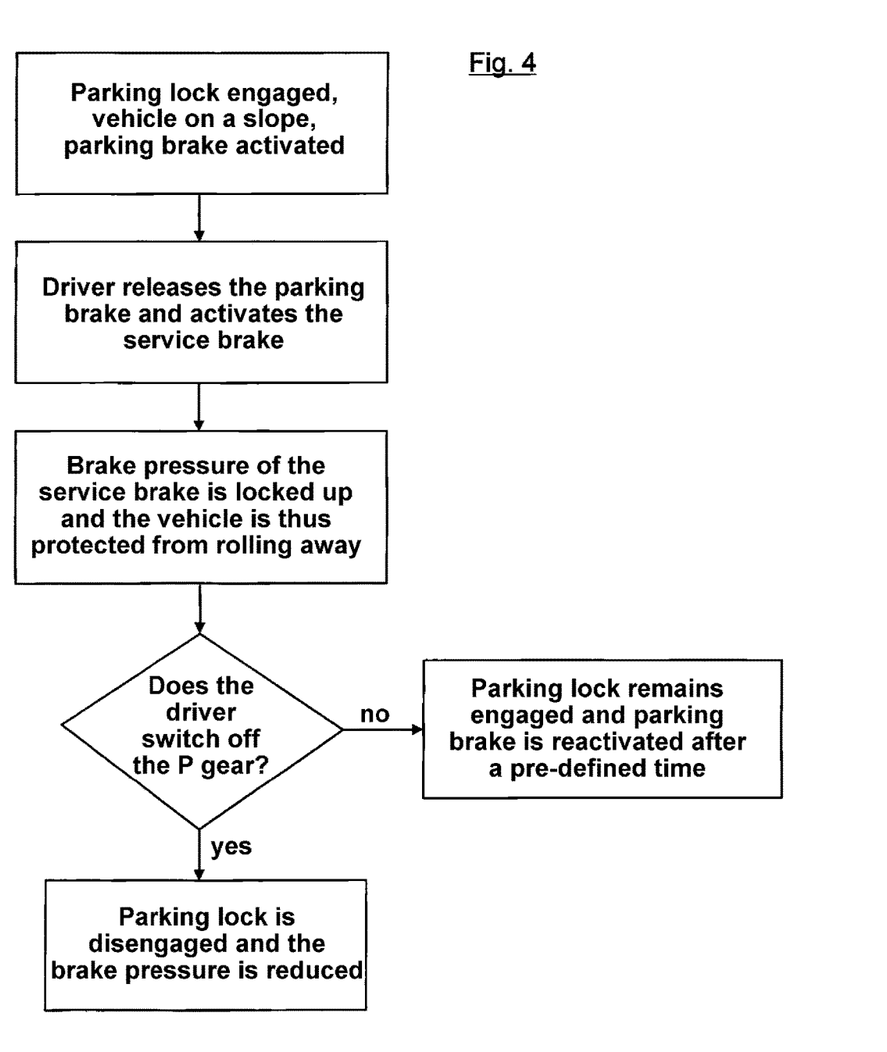
Figure 5:
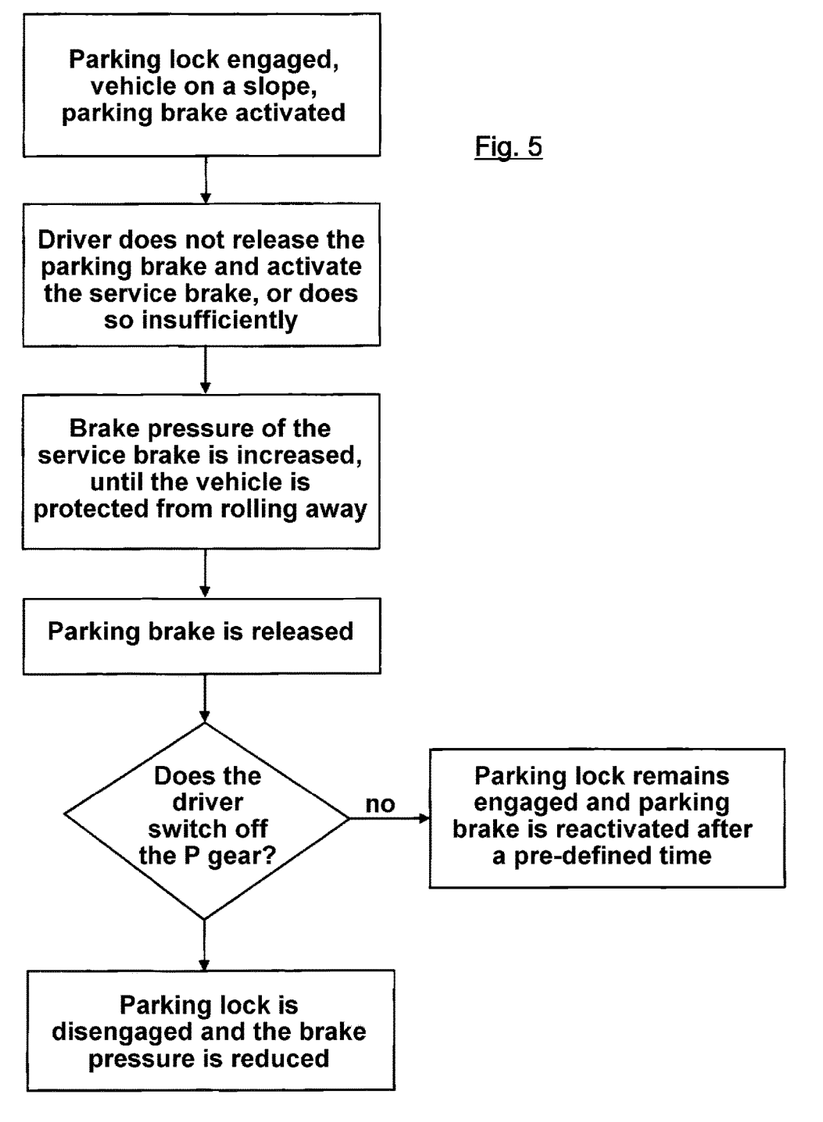
Figure 6:
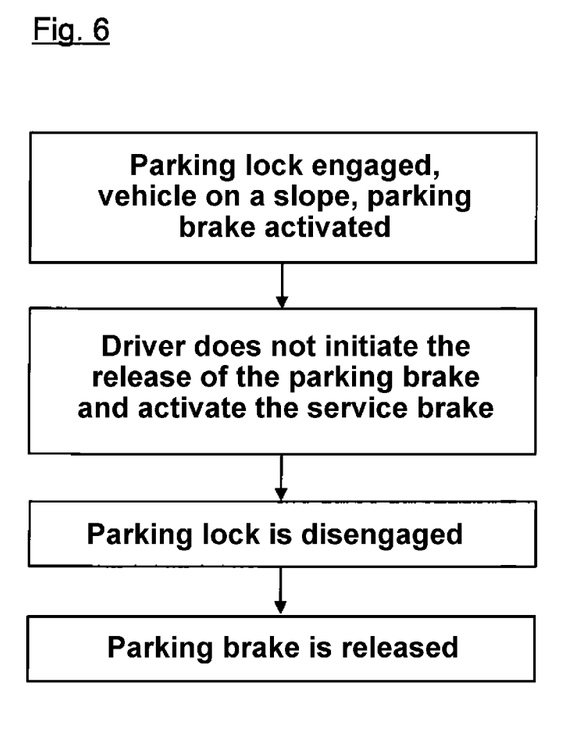

Then, various scenarios are exemplified via the flow charts in FIGS. 4 to 6, in which it can, for example, be made sure that a disengagement impulse can be reliably avoided even with a start-up procedure that was previously or already engaged, in each case with an engaged parking lock, preferably without load:

As shown in FIG. 4, it is first assumed that the vehicle is parked on a slope, the parking gear P is engaged and the parking brake is activated.

Now the driver releases the parking brake and activates (or steps on) the service brake, the brake pressure of the service brake locked via, for example, a corresponding valve control device in the brake circuit of the service brake, thus preventing the vehicle from rolling away via the service brake.

Then, it is checked if the driver actually switches off the parking gear P. If this is the case, the parking lock is released, and the brake pressure can be reduced as defined. A time delay, a reduction curve or various types of driving logic (e.g. driving is only allowed when the driving force is higher than the slope resistance) can be provided for this purpose.

However, if the driver does not switch off the parking gear for a defined period of time, it should be assumed that the driver does not wish to drive. In this case, the parking lock remains engaged, and the parking brake is reactivated via the control device. The switching off of the parking gear should likewise here and below be understood as simply an example and in a general sense: it should include any switching from a parking gear into a gear of the automatic gearbox that is not the parking gear.

As shown in FIG. 5, when the vehicle is parked on a slope, the parking gear P is selected or engaged and the parking brake is activated. Here, the driver also releases the parking brake in a way similar to the embodiment shown in FIG. 4, without activating (stepping on) the service brake or without activating it to the extent that is necessary to create sufficient brake pressure of the service brake, so that the vehicle is protected against rolling away via the service brake. This also expressly includes the case when the vehicle is operated automatically (for example with highly automated and piloted driving), as in this case, too, there is not service brake-side brake pressure.

Specifically, the brake pressure is mostly independently controlled by the control device, so that the brake pressure is increased (from zero, if necessary) to prevent the vehicle from rolling away, whereby disengaging the parking brake and/or releasing the parking lock is done only if the brake pressure is enough to prevent the vehicle from rolling away.

Then, it is checked if the driver actually switches off the parking gear. If this is the case, then disengaging the parking lock is allowed, and the parking lock can be disengaged. Then, the brake pressure can be reduced in a way shown above in relation to FIG. 4. Otherwise, the parking lock stays engaged, and the parking brake is likewise activated, similarly to the procedure shown above in relation to FIG. 4.

In FIG. 6, another alternative procedure is shown, in which it is assumed that the parking gear P is selected/engaged, the vehicle is parked on a slope, and the parking brake is activated. Now, if the driver initiates the release of the parking brake and does not step on the service brake, then, first, the parking lock will be released, and, afterwards, the parking brake will actually be released.

The invention claimed is:

1. A method for operating a braking device of a drive train of a vehicle, the drive train comprising an automatic gearbox having a gear-side parking lock, the vehicle further comprising a service brake and a parking brake that can be operated independently from the service brake;
   wherein the parking lock is configured to be engaged when a parking condition occurs and when the vehicle is protected from rolling away by the service brake that can be operated independently from the parking brake, wherein the engagement of the parking lock is controlled only via at least one control device; the method comprising:
   determining, when the parking condition occurs and the service brake is operated, if brake pressure applied by the service brake is sufficient to protect the vehicle against rolling away, and
   when the brake pressure applied by the service brake is determined to be sufficient to protect the vehicle against rolling away, engaging the parking lock via the control device.

2. The method according to claim 1, further comprising:
   when the brake pressure applied by the service brake is determined to be insufficient to protect the vehicle against rolling away, increasing the brake pressure applied by the service brake, and engaging at least one of the parking brake and parking lock upon increasing the brake pressure applied by the service brake sufficiently to prevent the vehicle from rolling away.

3. The method according to claim 1, further comprising activating, with the control device, the parking brake, upon detection of the parking condition.

4. The method according to claim 3, further comprising maintaining, and controlling by the control device, the level of brake pressure applied by the service brake that prevents the vehicle from rolling away until the parking brake achieves a fastening power threshold sufficient to prevent the vehicle from rolling away.

5. The method according to claim 4, wherein the level of brake pressure applied by the service brake is reduced by the control device after the fastening power threshold is achieved.

6. The method according to claim 1, further comprising determining, with at least one control device, in a case where the brake pressure applied by the service brake is not sufficient to prevent the vehicle from rolling away when the parking condition occurs, if the fastening force of the engaged parking brake is sufficient to prevent the vehicle from rolling away;
   when the fastening force of the parking brake is determined to be sufficient to prevent the vehicle from rolling away, further comprising engaging the parking lock; and
   when the fastening force of the parking brake is determined not to be sufficient to prevent the vehicle from rolling away, preventing the parking lock from being engaged until at least one of the brake pressure applied by the service brake and the fastening force of the parking brake are sufficient to prevent the vehicle from rolling away.

7. The method according to claim 1, wherein the parking condition comprises an engagement of a parking gear of the automatic gearbox.

8. The method according to claim 1, wherein the parking lock is configured to remain engaged when a driving condition occurs for the vehicle, and wherein the vehicle is configured to engage at least one brake device configured to prevent the vehicle from rolling away until the parking lock is disengaged.

9. The method according to claim 8, wherein the control device is configured to only disengage the parking lock if the service brake is preventing the vehicle from rolling away.

10. The method according to claim 9, wherein the method further comprises determining, by the control device, if the brake pressure applied by the service brake at the moment of disengaging the parking brake is set in a way that protects the vehicle against rolling away.

11. The method according to claim 10, wherein the method further comprises disengaging, with the control device, the parking lock if the brake pressure applied by the service brake is enough to prevent the vehicle from rolling away.

12. The method according to claim 9, wherein the vehicle is configured to, in the event of the brake pressure applied by the service brake not being sufficient to prevent the vehicle from rolling away, increase the brake pressure of the service brake sufficiently to protect the vehicle from rolling away.

13. The method according to claim 12, wherein the vehicle is configured to perform at least one of disengaging the parking brake or releasing the parking lock only if the brake pressure is enough to prevent the vehicle from rolling away.

14. The method according to claim 9, wherein the control device is configured to re-activate the parking brake if the driver does not, after releasing the parking brake, switch from the parking gear to a gear that is not the parking gear within a pre-defined period.

15. The method according to claim 8, wherein the control device is configured to reduce the service brake-side pressure that prevents the vehicle from rolling away when the vehicle has been switched to a gear other than the parking gear, so that driving is allowed, only when a driving force of the vehicle is greater than a slope resistance on the vehicle.

16. The method according to claim 8, wherein the control device is configured to, for a parked vehicle with the parking brake activated, only release the parking brake of the parked vehicle when the parking gear is switched off.

17. The method according to claim 8, wherein the at least one control device is configured to complete a disengagement procedure only if the at least one control device determines that the vehicle is parked with the parking lock engaged without any load.

18. The method according to claim 8, wherein the driving condition comprises at least one of: the switching of the parking gear to a gear that is not the parking gear of the automatic gearbox, the release of the parking brake, or the engaging of the service brake.

19. The method according to claim 1, wherein the at least one control device is configured to perform at least one of: electronically activating or deactivating the parking lock; electronically activating or deactivating the service brake, the service brake comprising at least one brake cylinder of at least one wheel of the vehicle; electronically maintaining, creating, or reducing brake pressure; or electronically activating or deactivating the parking brake, the parking brake comprising an electric parking brake.

20. The method according to claim 1, wherein the control device completes a parking procedure only when the vehicle is parked on a slope.

21. A control device configured to operate a parking lock of a vehicle, the vehicle comprising a service brake and a parking brake that can be operated independently from the service brake;
wherein the control device is configured to determine, when one or more parking conditions occur and the service brake is operated, if the brake pressure applied by the service brake is set in a way that protects the vehicle against rolling away, and
wherein the control device is configured to engage the parking lock via the control device, if, when the one or more parking conditions are present, the current brake pressure applied by the service brake is enough to prevent the vehicle from rolling away.

22. The control device according to claim 21, wherein the control device is configured to, for a parked vehicle having an engaged parking lock, when a driving condition has occurred, engage at least one brake device configured to prevent the vehicle from rolling away until the parking lock is disengaged.

23. A vehicle, the vehicle comprising a control device, the control device configured to operate a parking lock of the vehicle, the vehicle further comprising a service brake and a parking brake that can be operated independently from the service brake;
wherein the control device is configured to determine, when one or more parking conditions occur and the service brake is operated, if the brake pressure applied by the service brake is set in a way that protects the vehicle against rolling away, and
wherein the control device is configured to engage the parking lock via the control device, if, when the one or more parking conditions are present, the current brake pressure applied by the service brake is enough to prevent the vehicle from rolling away.

* * * * *